United States Patent [19]

Headley et al.

[11] 4,176,813
[45] Dec. 4, 1979

[54] SHARK NOSE FOR AIRCRAFT

[75] Inventors: Jack W. Headley, Rancho Palos Verdes; Andrew M. Skow, Hermosa Beach; Andrew Titiriga, Jr., Torrance, all of Calif.

[73] Assignee: Northrop Corporation, Los Angeles, Calif.

[21] Appl. No.: 967,162

[22] Filed: Dec. 7, 1978

Related U.S. Application Data

[63] Continuation-in-part of Ser. No. 839,583, Oct. 5, 1977, abandoned.

[51] Int. Cl.² .................... B64C 1/00; B64C 21/10
[52] U.S. Cl. ..................................... 244/130; 244/119
[58] Field of Search ............. 244/130, 119, 36, 117 R, 244/15, 13, 1 R

[56] References Cited

U.S. PATENT DOCUMENTS 3,139,244  6/1964  Bright .................... 244/117 R X

OTHER PUBLICATIONS

"Northrop RF-5A", *Jane's All The World's Aircraft*, 1969-1970, 8/1970, p. 404.

*Primary Examiner*—Barry L. Kelmachter
*Attorney, Agent, or Firm*—Edward A. Sokolski

[57] ABSTRACT

An aircraft nose and forebody shaped to produce relatively ideal vortex patterns which will provide improved static directional stability of the aircraft in the stall angle of attack region and above. The nose is shaped from its forwardmost tip with a broad, flattened lateral cross section having relatively sharp edges extending around each lateral surface, blending rearwardly to a radius approximately midway between the top and bottom surfaces of the forebody in the region where separation of the vortices is desired.

5 Claims, 21 Drawing Figures

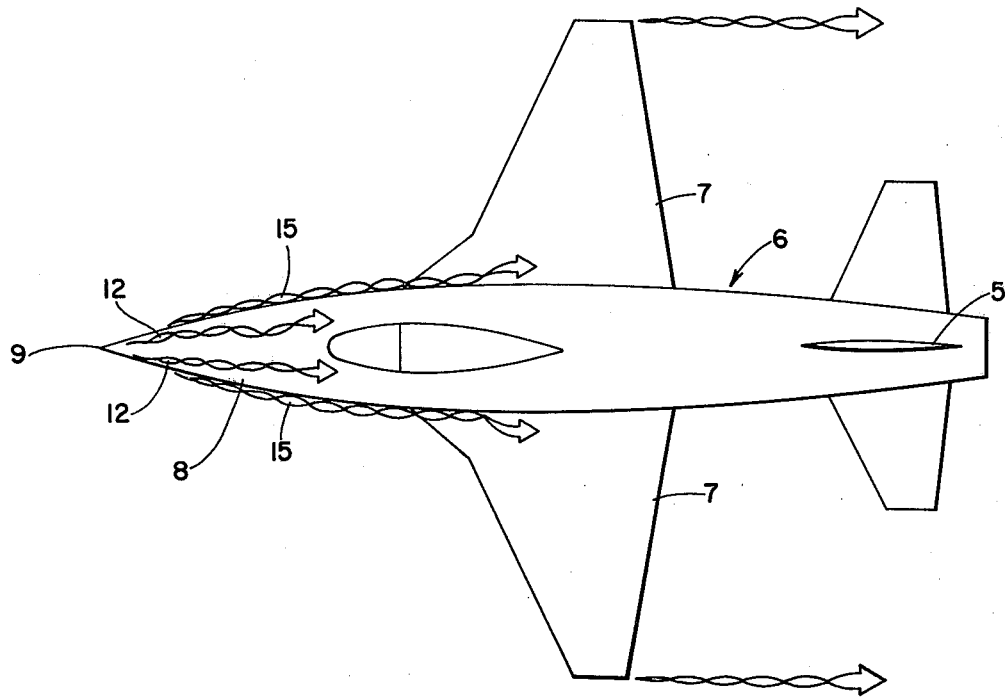
FIG. 1
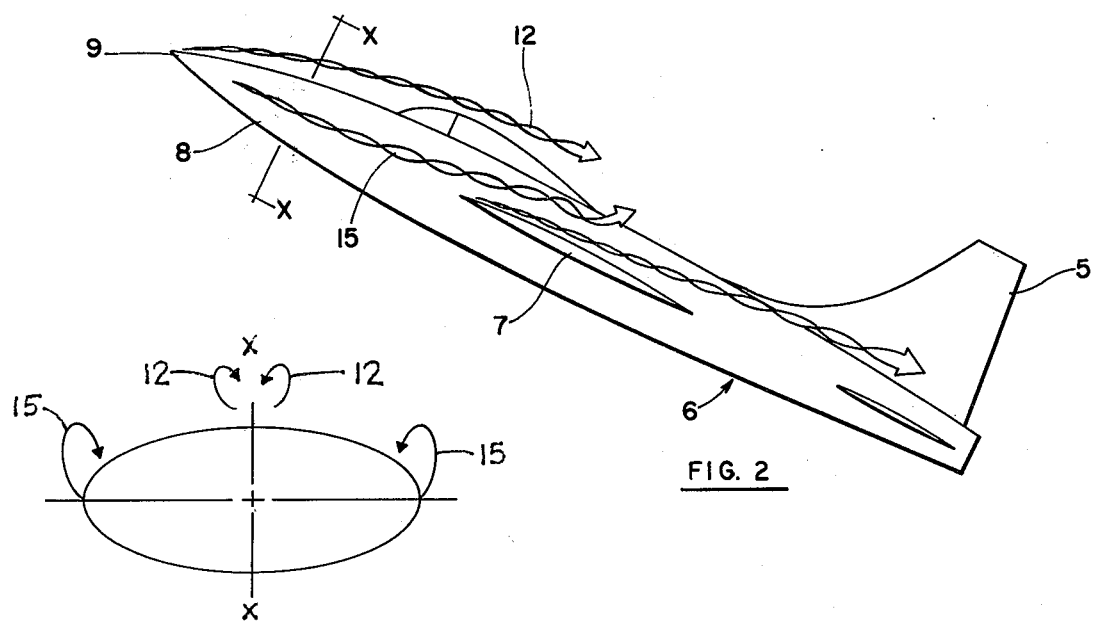
FIG. 2
FIG. 2b

REGION A
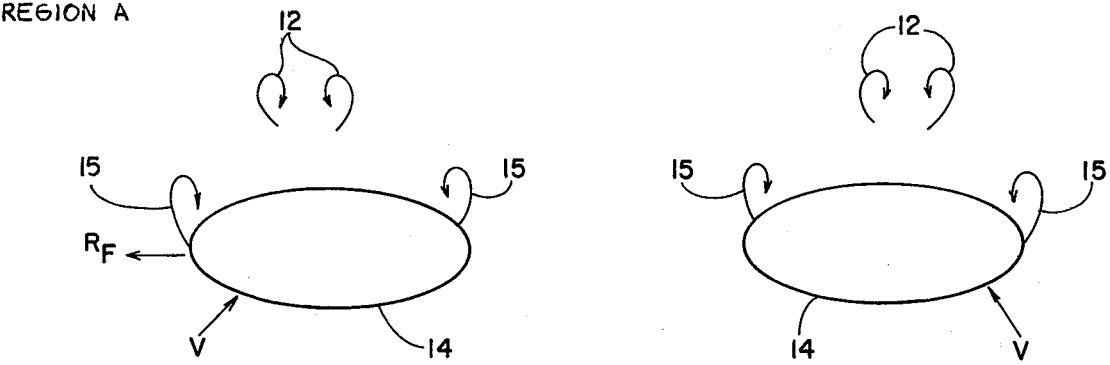
- STRONG VORTICES
- ASYMMETRIC PATTERN
- $R_F$ STABLE BUT ASYMMETRIC
REGION B
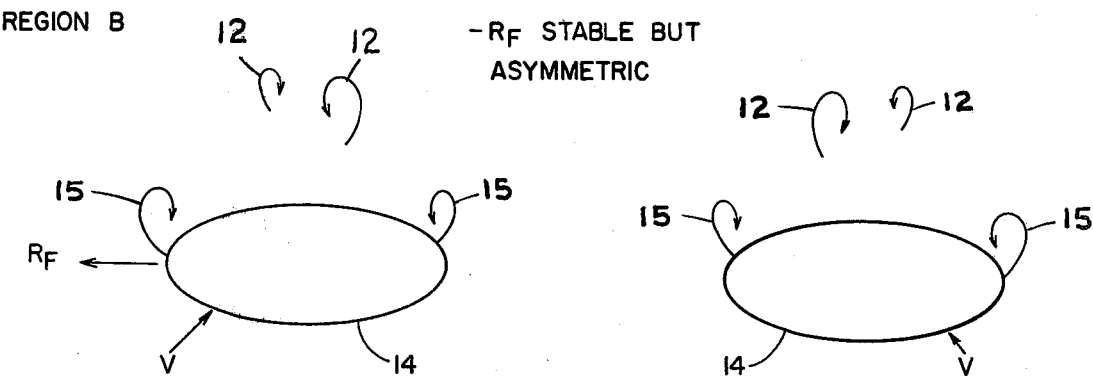
- STRONG VORTICES
- STRONG ASYMMETRIES
- $R_F$ DIRECTIONAL
REGION C
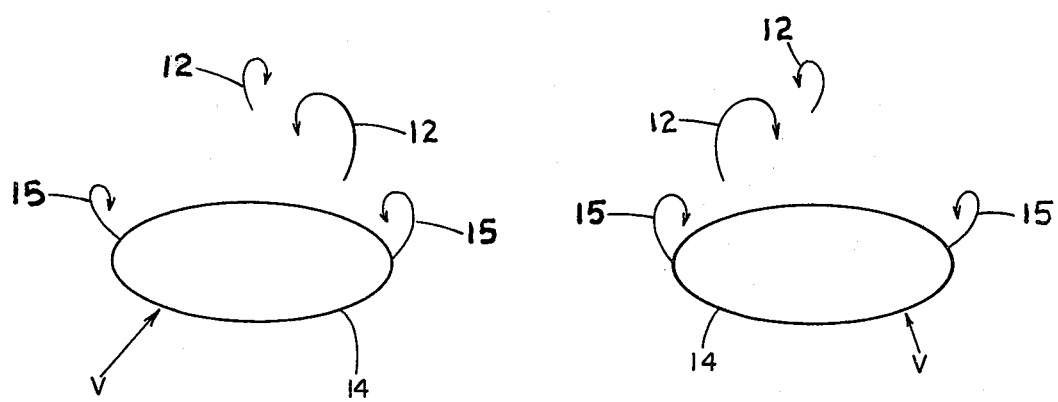
AIRPLANE YAWING TO THE LEFT   FIG. 4b   AIRPLANE YAWING TO THE RIGHT

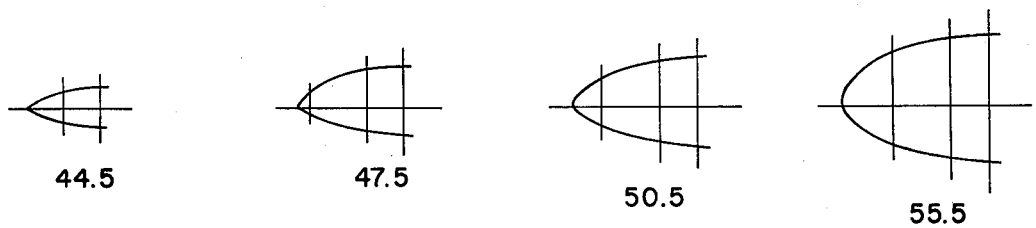
| 44.5 | 47.5 | 50.5 | 55.5 |
| --- | --- | --- | --- |
| FIG. 7a | FIG. 7b | FIG. 7c | FIG. 7d |
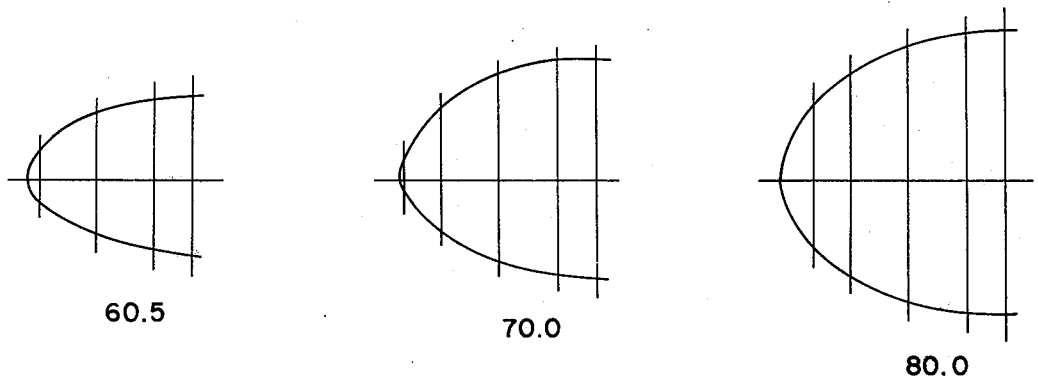
| 60.5 | 70.0 | 80.0 |
| --- | --- | --- |
| FIG. 7e | FIG. 7f | FIG. 7g |
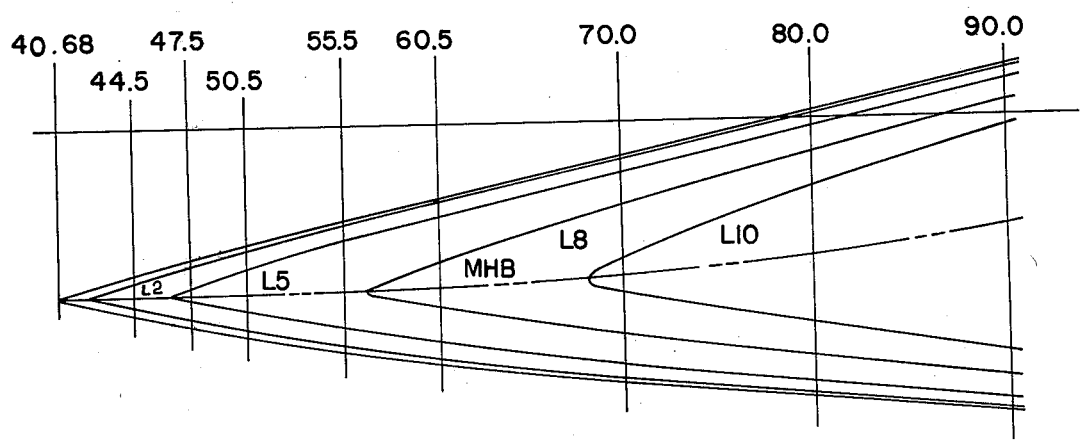
FIG. 6

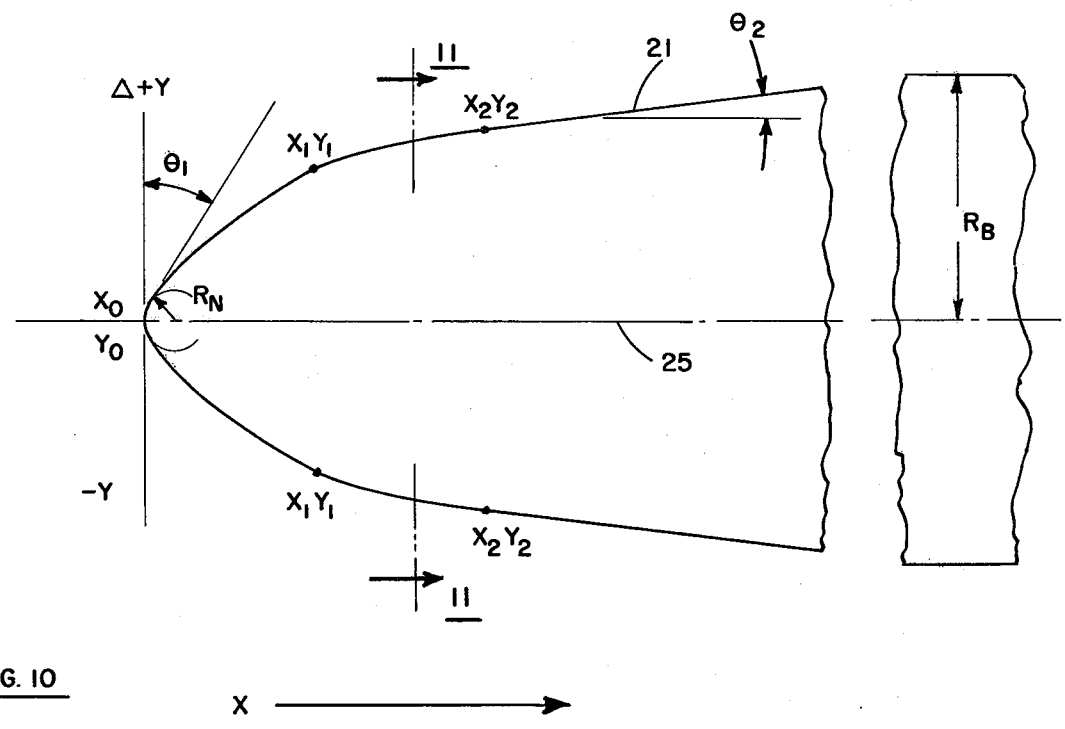
FIG. 10
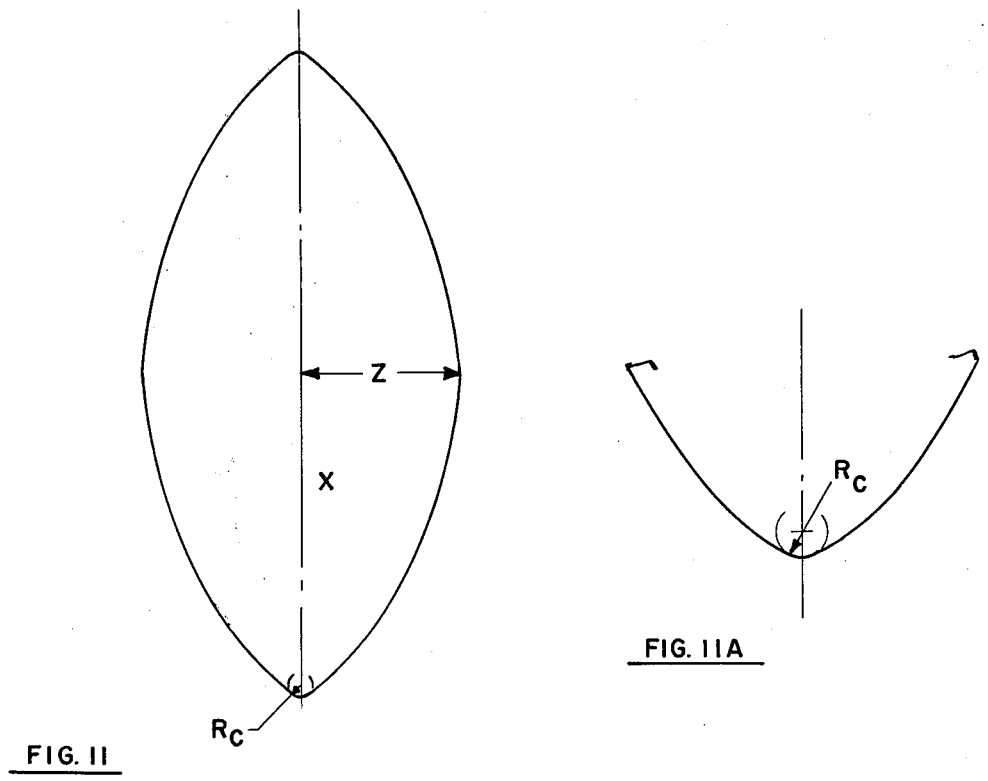
FIG. 11
FIG. 11A

| $X/R_B$ | $Y/R_B$ | $Z/R_B$ | $R_C/R_B$ | STATION |
|---|---|---|---|---|
| 0 | 0 | 0 | .006 | $X_0, Y_0$ |
| .05 | .085 | .020 | .006 | |
| .10 | .132 | .0338 | " | |
| .15 | .170 | .0462 | " | |
| .20 | .2025 | .058 | " | |
| .25 | .234 | .069 | " | |
| .30 | .260 | .080 | " | |
| .35 | .284 | .090 | " | $X_1, Y_1$ |
| .40 | .305 | 0.100 | .008 | |
| .45 | .322 | 0.11 | .0097 | |
| .50 | .335 | 0.119 | .0115 | |
| .55 | .350 | 0.129 | .0135 | |
| .60 | .3625 | 0.139 | .0155 | |
| .80 | .385 | 0.157 | — | |
| 1.00 | .405 | 0.175 | — | |
| 1.20 | .425 | 0.1925 | — | |
| 1.40 | .442 | 0.210 | — | |
| 1.60 | .459 | 0.227 | — | |
| 1.80 | .475 | 0.244 | — | |
| 2.0 | .489 | 0.26125 | — | $X_2, Y_2$ |

FIG. 12

SHARK NOSE FOR AIRCRAFT

ORIGIN OF THE INVENTION

The Government has rights in this invention pursuant to Contract No. F33657-75-C-0199 awarded by the United States Air Force.

This application is a continuation-in-part of our application Ser. No. 839,583, filed Oct. 5, 1977, now abandoned.

BACKGROUND OF THE INVENTION

Aircraft of generally conventional design and shape obtain directional stability primarily from a vertical fin mounted on the aft end of the fuselage, which fin produces an aerodynamic restoring force to return the aircraft to a straight course whenever yawing conditions are encountered during flight.

Since the location of the vertical fin places it in the wakes, i.e., regions of disturbed flow, that form behind the wings and fuselage in flight, the effectiveness of the fin to perform its function is impaired thereby, particularly at the higher angles of attack wherein these regions of disturbance grow relatively large. At and above the wing stall angle of attack the turbulent flow from the wing, coupled with interference from the fuselage, increases to critical proportions that can totally eliminate the effectiveness of the fin resulting in troublesome and even dangerous directional instability of the aircraft. Moreover, at these post stall angles of attack, body effects begin to exert an aerodynamic influence on the total stability of the aircraft. The forebody of the fuselage generates a vortex system, analogous to that produced by a circular cylinder in two dimensional flow, which vortices can have an undesirable effect on the stability of the aircraft. The strength and orientation of the nose vortices are functions of the forebody fineness ratio, i.e., ratio of length to diameter, cross-sectional shape, nose bluntness, and planform shape.

By "nose" we mean the forwardmost tip or leading edge of the fuselage. By "forebody" we mean the section of the fuselage extending from the nose to the region forwardly of the cockpit and leading edges of the wings. The overall effect of the nose vortices can be either stabilizing or destabilizing, depending on the effects of disturbances on the vortex formations.

We have found that by appropriately shaping the nose and forebody, the arrangement or pattern of the nose vortices can be controlled to enhance the directional stability of the aircraft over a much greater range of angle of attack than that produced by the vertical fin per se, and thus significantly increase the operational capability of the aircraft.

PRIOR ART STATEMENT

The following patents are cited herein as the most pertinent prior art of which applicants are aware:

| United States Patents: | | |
|---|---|---|
| Number | Name | Date |
| 2,596,139 | Fletcher | May 13, 1952 |
| 2,874,922 | Whitcomb | Feb. 24, 1959 |
| 2,898,059 | Whitcomb | Aug. 4, 1959 |
| 2,984,439 | Fletcher | May 16, 1961 |
| Foreign Patents: | | |
| 301,390 | Germany | Mar. 25, 1914 |
| 932,410 | Germany | Mar. 21, 1944 |

| -continued | | |
|---|---|---|
| United States Patents: | | |
| Number | Name | Date |
| Other References: | | |
| None | | |

U.S. Pat. No. 2,596,139 (Fletcher) is deemed relevant because it discloses a streamlined body, such as an auxiliary fuel tank for aircraft, designed and shaped to be relatively free of parasitic drag, and to resist air turbulence and compressibility during high speed flight. However, a principal feature of the streamlined body described and claimed in U.S. Pat. No. 2,596,139 is its freedom from projections or surfaces such as wings, cockpit canopies, tail surfaces, etc., and is concerned with the overall shape of the body, from nose to tail section, and no suggestion or descriptive text appears in the specification relating to the control of nose vortices.

U.S. Pat. No. 2,874,922 (Whitcomb) discloses the now well-known procedure for developing the "coke bottle" design based on Whitcomb's theory of "area rule" and relates primarily to the shaping of an entire aircraft fuselage to reduce the strength of shock waves about airplanes at transonic and supersonic speeds.

Since the Whitcomb "coke bottle" fuselage has been accorded wide notoriety and popularity in aviation, it is not deemed necessary to describe in detail the method used for determining the location and cross-sectional shapes developed between the fuselage nose and tail, except to state that applicants' invention herein described and claimed relates solely to a shape for an aircraft fuselage nose only, and is not concerned with the fuselage shape aft of the nose and forebody shape.

Similar to the above cited U.S. Pat. No. 2,874,922 (Whitcomb), U.S. Pat. No. 2,898,059 (also Whitcomb) discloses a design in which the fuselage is shaped, primarily aft of the nose section, to reduce the strength of the initial shock wave, and thus "shock stall" on the lifting wings of the aircraft. As with U.S. Pat. No. 2,874,922, Whitcomb's U.S. Pat. No. 2,898,059 covers a fuselage that is believed to be well-known in the aerodynamic arts and requires no amplification except to state that the applicants' invention, as described and claimed in the present application, relates solely to a design technique and resultant shape for an aircraft nose calculated to control the vortices generated thereby.

U.S. Pat. No. 2,984,439 (Fletcher) described a streamlined body, such as an auxiliary fuel tank for aircraft, applying the well-known "area rule" theory, disclosed by Whitcomb in U.S. Pat. No. 2,874,922, to the mid-section of the tank.

The two German Pat. Nos. 301,390 and 932,410 are cited because each appears from the drawings (an English translation is neither available nor deemed necessary) to relate to specific fuselage shapes of aft of the nose section rather than to the specific shaping of the nose, per se, as is described and claimed herein by applicants.

While it is possible that more pertinent prior art exists, the applicants' search is believed to have been conducted with conscientious effort to locate and evaluate the most pertinent prior art available at the time, but is not to be construed as a representation that no better art exists.

It is a primary object of the present invention to provide a design and shape for an aircraft nose and fuselage forebody which controls the pattern or formation of the vortices generated thereby, to provide directional stability at the higher angles of attack where the effectiveness of the vertical fin is impaired.

DESCRIPTION OF THE DRAWINGS

FIG. 1 is a simplified plan view of an aircraft of generally conventional design approximating the generation and separation of vortices from the aircraft nose and fuselage forebody.

FIG. 2 is an elevational view of the aircraft shown in FIG. 1, flying at an angle of attack approaching wing stall, showing typical sets of vortices emanating from the nose and fuselage forebody.

FIG. 2b is a cross-sectional head-on view taken on line X—X of FIG. 3, showing typical nose and fuselage forebody vortices.

FIG. 4b shows diagrammatic forebody cross-sectional views illustrating the relative strength and symmetries of typical vortices generated in the three distinct regions described with reference to FIG. 4.

FIG. 6 is a contour plot of an elevational view of the nose and forebody of the present invention.

FIG. 7a–7g show the cross-sections taken on the corresponding fuselage station lines of FIG. 6.

FIG. 10 is a plan view of a preferred embodiment of the invention diagrammatically illustrating the various parameters of this embodiment.

FIG. 11 is a cross-sectional view taken along the plane indicated by 11—11 in FIG. 10.

FIG. 11a is a fragmentary detailed view showing the edge radius of the preferred embodiment.

FIG. 12 is a table of offsets used in plotting the planform contour of the preferred embodiment.

SUMMARY OF THE INVENTION

Figure 3:
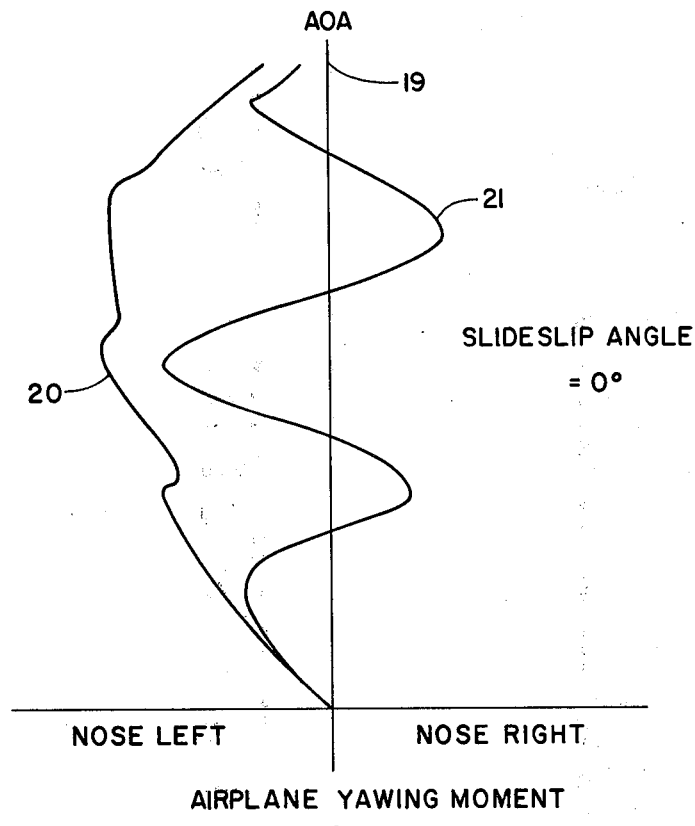
FIG. 3 is a graphical representation illustrating the destabilizing effect of increasing angle of attack on the yawing moment of an aircraft having a conventional nose and forebody.

The invention relates to a fuselage nose shape, called herein a "shark" nose for its somewhat superficial resemblance to the nose of the common shark, but somewhat more complex in shape tending to flatten in the lateral direction toward its nose and tapering to a blunt, relatively thin, knife-like edge at the extreme tip of the nose.

The so-called "shark nose" is designed for use in the Northrop F-5F fighter aircraft, and is shaped specifically to produce a stable pattern of vortices at medium and high post stall angles of attack. In actual flight tests the shark nose has proven to enhance to a considerable degree the static directional stability of the aircraft in the stall angle of attack region and beyond.

DETAILED DESCRIPTION

Conventional aircraft, such as that diagrammatically shown in FIGS. 1 and 2, obtain directional stability primarily from a vertical fin 5 located at the aft end of the fuselage 6. Due to the aft location of the fin, its effectiveness is severely reduced by the wakes trailing behind the wings 7 and fuselage forebody 8, especially at the higher angles of attack where these wakes can become relatively large. At and above the wing stall angle of attack the separated flow from the wing and obstruction or interference the fuselage 6 are such that the effectiveness of the fin can be substantially eliminated, at which point the directional stability of the aircraft becomes highly unstable.

At the post stall angles of attack, body effects exert an influence on the stability of the aircraft, i.e., the airplane fuselage forebody generates a vortex system, somewhat similar to that produced by a circular cylinder in two dimensional flow, and the pattern of this vortex system has a large effect on the stability of the aircraft. The strength and orientation of this vortex system is a function of the forebody fineness ratio, i.e., the ratio of its length to diameter, forebody cross-sectional shape, nose bluntness, and planform shape.

The overall effect of the nose vortex system can be either stabilizing or destabilizing, depending on the effects of disturbances on the vortex patterns. By appropriately shaping the fuselage nose and fuselage forebody, it is possible to more precisely control the specific formation or pattern of the vortices and thereby improve the directional stability of the aircraft over a much greater range of angle of attack than can be provided by the vertical fin alone, and thus significantly increase the operational capability of the aircraft.

Referring to FIGS. 1, 2 and 2b the forebody vortex system consists of two major pairs of vortices. One pair 12, called the nose vortices, is generated by the tip of the nose 9 per se. The nose vortices 12 detach from the fuselage forebody 14 almost immediately. The second pair 15, called the fuselage forebody vortices, is generated by the separation of the flow around the forebody 14 and remain in the vicinity of the fuselage 6 until other factors, such as the effects of the wing 7 come into play. The interaction and alignment of the two pairs of vortices 12 and 15 determine the degree of directional stability or instability that the forebody 14 of the aircraft will provide at high angles of attack.

Conventional high speed aircraft necessarily require long slim fuselages with sharply pointed noses for minimum drag. However, the nose vortices generated by such slim pointed noses detach from the fuselage forebody surface in an asymmetrical manner somewhat analogous to a Karman vortex street. By "Karman vortex street", we mean, that under certain conditions vortices tend to detach alternately from either edge of an obstacle placed across stream. The vortices break away to form in the wake a pattern known as the Karman vortex street. At low angles of attack the vortices form in a substantially regular fashion, but at higher angles of attack regularity disappears and the wake becomes a turbulent mass of vortices of all shapes and sizes. The resultant asymmetrical arrangement of fuselage forebody vortices produces unbalanced pressure forces across the forebody. The unbalanced pressure forces, having a center of pressure forwardly of the aircraft center of gravity, result in instabilities at zero angle of slideslip.

Some typical example of yawing moments obtained from wind tunnel tests on the Northrop F5 aircraft are shown in the graph of FIG. 3 where the center line 19 AOA represents angle of attack indicating that yawing moments at zero sideslip can either increase erratically as the angle of attack is increased as shown by line 20, or become highly oscillatory as shown by line 21, depending on minor variations of the nose tip geometry. Similarly, it can be shown that the stability of the nose at some non-zero value of sideslip is determined by the formation of the forebody vortices.

Figure 4:
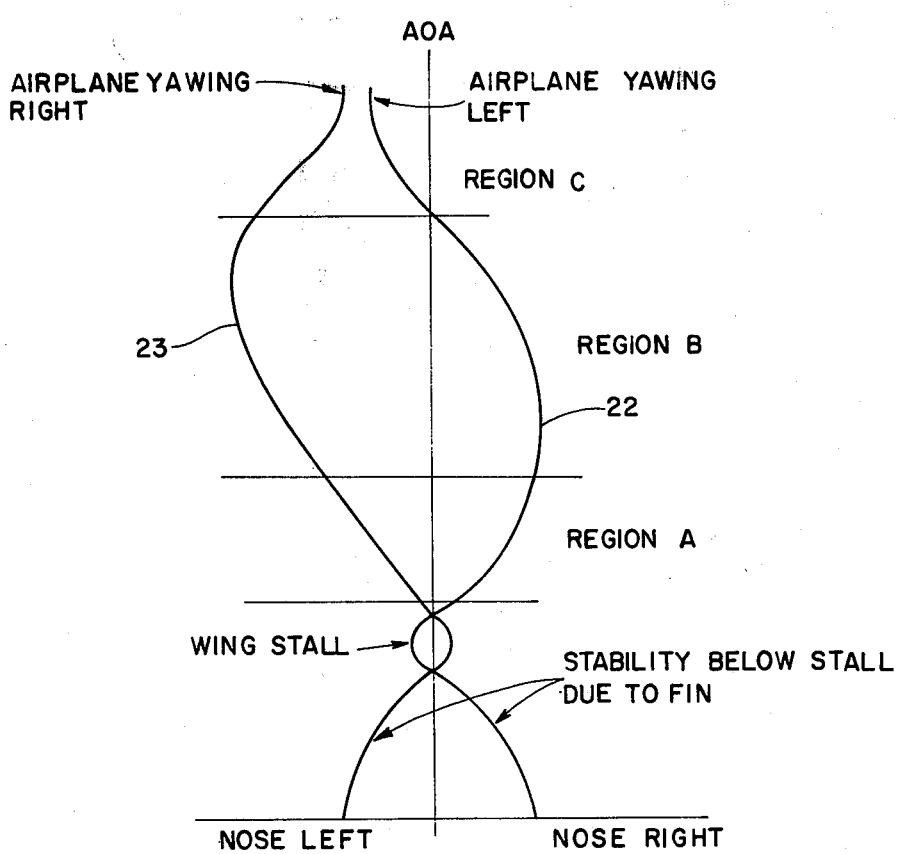
FIG. 4 is a graphical representation, similar to the graph of FIG. 3, illustrating the effect of increasing the angle of attack on the yawing moment of an aircraft having a conventional nose and forebody, with reference to three distinct regions above and below wing stall.

FIG. 4 graphically illustrates certain wind tunnel data derived at yawing moments during nose left and nose right attitudes represented by lines 22 and 23 respectively as a function of angle of attack (AOA). For stability a restoring force, $R_f$, is required to counter the disturbance herein illustrated by velocity (V) which is the component of freestream velocity normal to the fuselage nose, with reference to three distinct regions as diagrammatically depicted in FIG. 4b with reference to FIG. 4 where region A is the region just above wing stall and indicates a relatively stable and symmetrical effect. The vortex pattern occurring in region A is shown in FIG. 4b, the vortices at this angle being weak and behaving in a symmetrical manner. $R_f$ is the force generated by the airplane to restore the airplane to its original undisturbed state.

As the angle of attack increases into region B the component of freestream velocity normal to the nose also increases, and this in turn increases the strength of the vortices generated by the nose.

Region B is still stable, but the degree of stability depends on the angle of sideslip indicating a stable but asymmetric vortex pattern has formed around the nose.

Further increases of AOA show the asymmetries also increasing, until at the end of Region B the aircraft has stability only when the nose is disturbed toward the left.

As indicated in Region C, the dominance of the asymmetric vortex pattern continues across this region, with the strengthening of the unidirectional restoring force ($R_f$). These vortex patterns are typical of aircraft of the Northrop F5 type which have broad elliptical nose cross sections. Other aircraft with differently shaped nose cross sections will, of course, exhibit different results; possibly without any region of positive nose stability.

Thus it can be seen that forebody vortex patterns strongly influence the degree of stability the nose of an aircraft will provide both at zero sideslip and at non-zero values of sideslip, and, therefore, the shape of the nose and fuselage forebody has the potential to augment directional stability of the aircraft when the vertical fin is relatively ineffective.

We have discovered that, by appropriately shaping the nose and forebody of the fuselage, the vortex system can be controlled to produce a substantially improved stabilizing effect on the aircraft.

Bearing in mind the objectives set forth above in accordance with our invention, the fuselage nose must be shaped to control the vortices and ensure that the vortices formed at the nose are strong and stable. With strong and stable nose vortices, the fuselage separation vortices will be symmetrical, which symmetrical separation will produce balanced pressure forces across the forebody and hence virtually eliminate zero sideslip forces. If the nose is statically stable, the fuselage forebody will provide restoring forces that counteract any disturbances that occur at high angles of attack.

Figure 5:
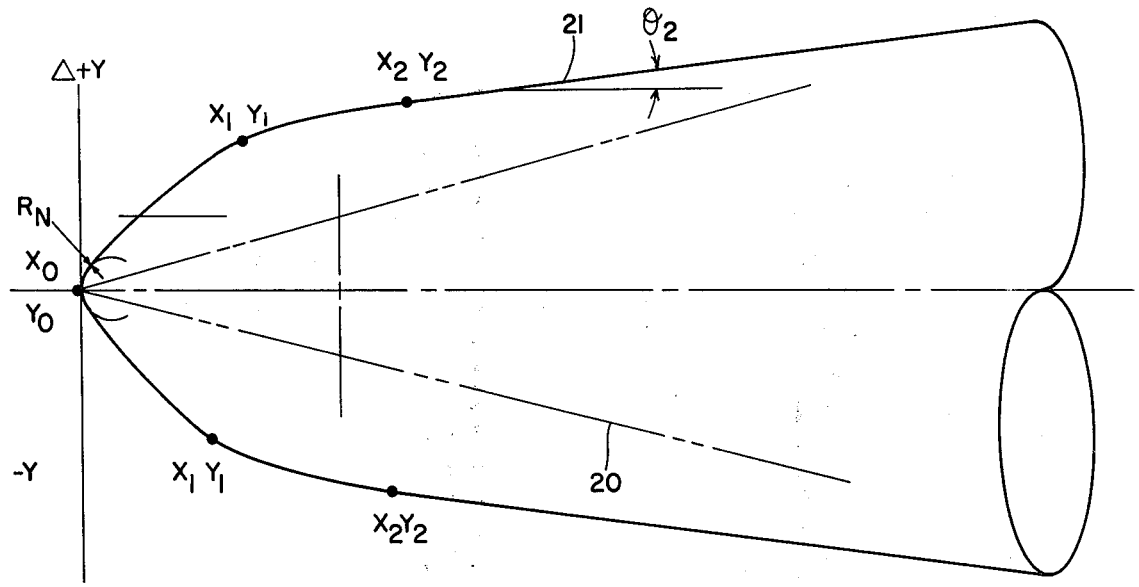
FIG. 5 is a plan view showing the nose and fuselage forebody shape of the present invention superimposed over the nose of a conventional high speed aircraft.

Referring to the diagrammatic illustration of FIG. 5, we show in phantom line a planform view of a conventional needle-nose aircraft forebody 20, in conjunction with a solid outline of a preferred shape for a nose and forebody 21 contoured in accordance with our invention, superimposed thereon. As shown, the radius of the nose $R_n$ on either side sweeps rearwardly from the tip $X_0 Y_0$ with a slight curvature, at an angle $O_1$, to point $X_1$–$y_1$ so that no leading edge separation will occur over the region $X_O Y_O$ to $X_1 Y_1$ which region is selected to control the spacing of the nose vortex pair, thus ensuring that a consistent separation location is maintained. A transition region extends rearwardly from $X_1 Y_1$ to $X_2 Y_2$ which blends the nose region into the aircraft fuselage as approximately indicated at $O_2$.

The minimum radius at the tip of the nose is of major importance in that it ensures that the air flow will separate from the surface where required. For this reason, the radius is made small at the nose tip, but increases in the blending region, becoming relatively large as the forebody blends into the fuselage proper. In planform, therefore, the nose and forebody shape resembles a shark.

In cross section, with reference to the elevational or profile view of FIG. 6, cross-reference with FIGS. 7a–7g, the cross section of the nose and forebody blends from a more or less asymmetrical lens shape shown in FIG. 7a, increasing in size to FIG. 7b and to FIG. 7c wherein the cross section transforms from a relatively sharp ridge or edge 25 to a slightly rounded edge 26 respectively. From FIGS. 7e to 7g the cross section becomes more elliptical with a larger edge radius enlarging in volume on both axes wherein the forebody blends into the fuselage proper with a slightly curved surface. It will be seen that, from the tip of the nose 13 to approximately station 7d, the edge is sharp becoming more blunt or rounded with a small radius to FIG. 7g wherein the cross section expands to approximately a 45° ellipse.

While the upper surface of the forebody tapers rearwardly to the fuselage in a substantially straight line, it will be noted that the underside of the forebody tapers with a slight curvature to the fuselage.

In this manner, it will be seen that the flow separation is delayed until adequate spacing and strength of the nose vortex pair is achieved somewhere in the region of FIG. 7c.

With a strong, stable nose vortex pattern the fuselage vortices are also stabilized, thus substantially eliminating any yawing moments at zero sideslip such as occur with a conventional nose and fuselage forebody when the effectivity of the vertical fin is impaired.

Figure 8:
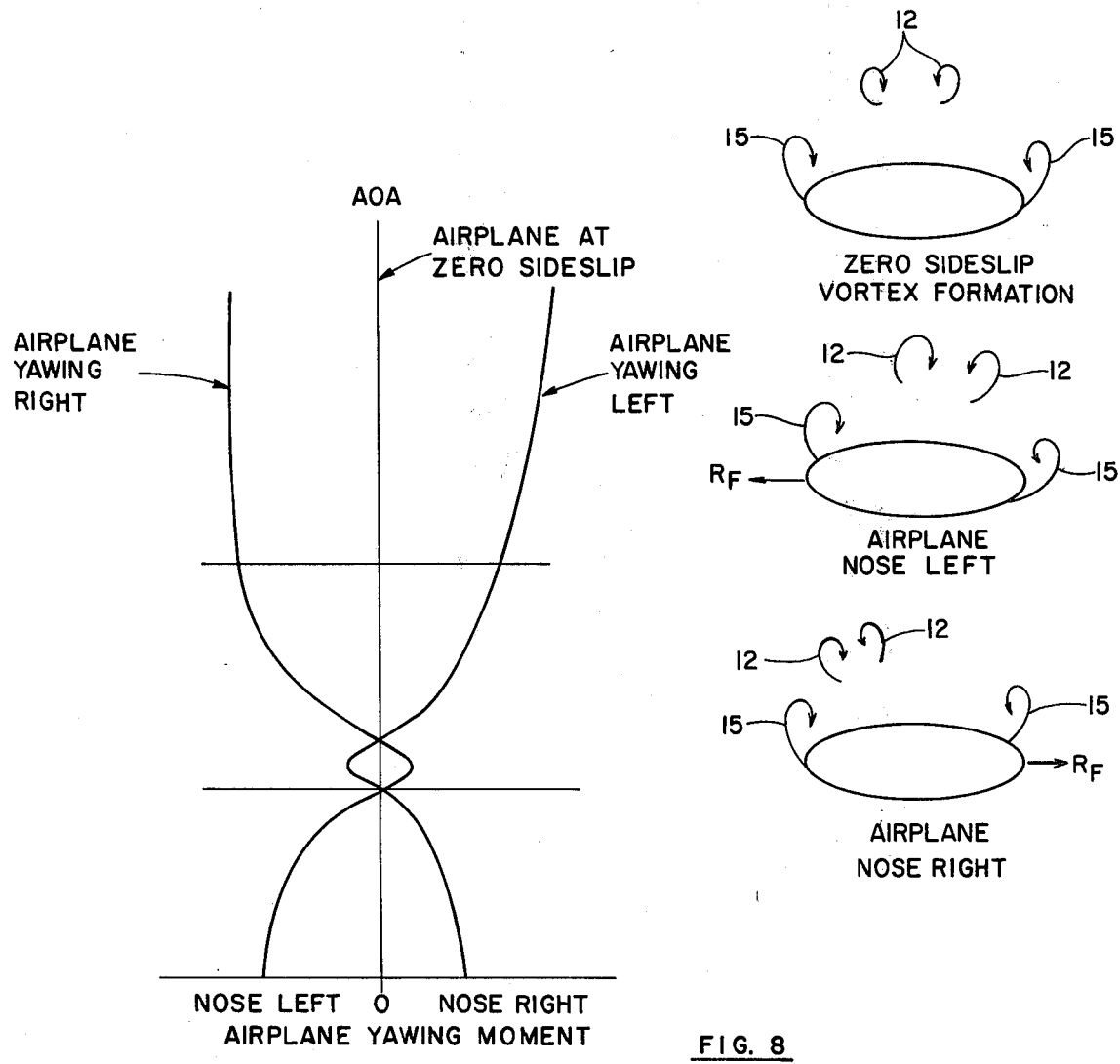
FIG. 8 is a graphical representation similar to the graphical representation of FIG. 4 showing the stability achieved by the strong, stable pairs of vortices achieved with the nose and forebody shape of the present invention.

It will also be understood that equal static directional stability left and right is provided by the stable set of nose and fuselage vortices, acting on the relatively broad elliptical forebody shape, as illustrated in the graph of FIG. 8.

Figure 9:
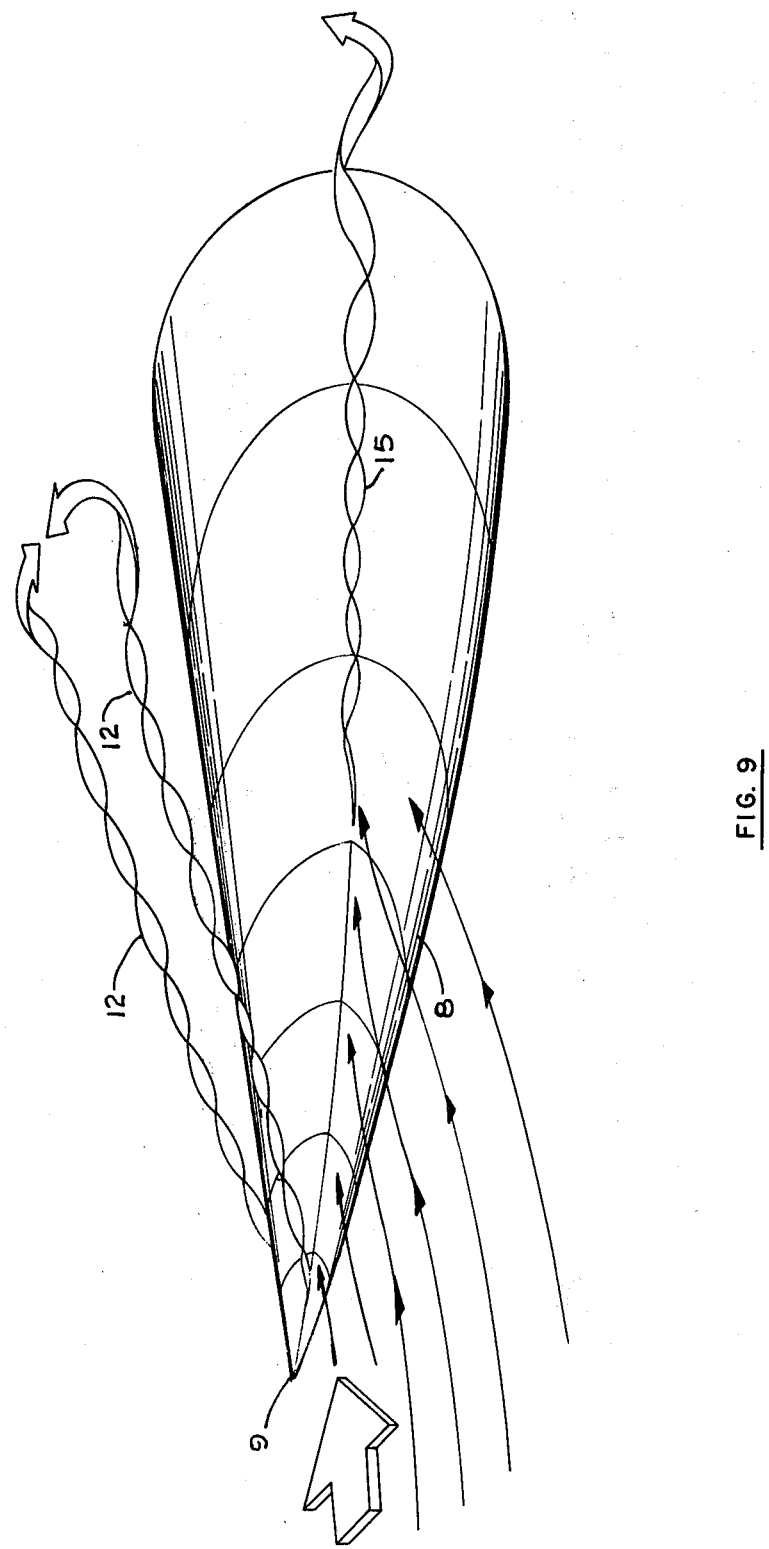
FIG. 9 is an elevational view, in perspective, of the nose and forebody shaped in accordance with the present invention diagrammatically illustrating the concentration of flow and vortex separation region thereon.

FIG. 9, for the sake of clarity, is a perspective view taken from the side and slightly forwardly of the nose and forebody section, showing the shark-like configuration discussed above, as an aircraft equipped with the shark nose heads into the wind. It will be noted that the nose and vortices, 12 and 15, as diagrammatically shown, separate from the nose 9 and forebody 8 in a symmetrical and regular manner.

Referring now to FIGS. 10-12, various parameters are shown and specifically defined for a preferred embodiment of the invention which has been incorporated into the Northrop F-5F fighter aircraft. This data is given in non-dimensionalized form in terms of the body planform radius, $R_B$, of the fuselage, as shown in FIG. 10. This radius is that of the body of the aircraft fuselage taken at the midpoint of the longitudinal centerline 25 thereof. Referring to FIGS. 10 and 11, $X_1$, $Y_1$ and $X_2$, $Y_2$ are predetermined "stations" along the nose as defined in terms of positions along the X and Y axes from the tip of the nose which is defined by $X_0$, $Y_0$. The values of the other parameters for the preferred embodiment are as follows:

Planform nose radius, $R_N = 0.075 R_B$
Angle $\theta_1 = 37°$
Angle $\theta_2 = 8°$ The edge radius, $R_c$ (shown in FIG. 11a), is constant in the region between $X_0$, $Y_0$ and $X_1$, $Y_1$ and increases linearly as shown in the table of offsets of FIG. 12 from $X/R_B = 0.35$ to $X/R_B = 0.60$. No discrete edge radius exists after station $X/R_B = 0.60$. It is further to be noted that after station $X_2$, $Y_2$, the nose blends into the basic nose fuselage, the fuselage planform expanding in the linear manner at the angle $\theta_2$. The cross section of the nose, as can be seen from FIG. 11, is generally elliptical in shape.

While we have described and shown the nose and forebody shape with respect to a preferred embodiment, other modifications and embodiments will occur to those skilled in the art, which will fall within the spirit and scope of our invention as recited in the following claims.

We claim:

1. A nose and forebody for an aircraft fuselage characterized by a nose tip having a slight radius in planform and flattened profile in elevation, said nose tip tapering broadly rearwardly with relatively sharp lateral edges on each side thereof, said nose tapering more acutely as said nose blends into said forebody, the cross-sectional shape of said forebody rearwardly of said nose tip and said lateral edges gradually thickening in elevation from a relatively narrow elliptical shape to a relatively broad elliptical shape, the dimensions of said nose and forebody varying as functions $X/R_B$, $Y/R_B$ and $Z/R_B$ where "X" is the distance from the nose tip, "Y" is the distance of the fuselage skin from the centerline of the aircraft fuselage taken transversely, "Z" is the distance of the fuselage taken vertically and $R_B$ is the body planform radius of the fuselage taken at the midpoint of the longitudinal centerline thereof, $X/R_B$ varying between zero and approximately 0.35, $Y/R_B$ varying between zero and approximately 0.284 and $Z/R_B$ varying between zero and approximately 0.09 in a first region between a first station $X_0 Y_0$ at the nose tip and a second predetermined station $X_1 Y_1$ and $X/R_B$ varying between approximately 0.35 and 2.0, $Y/R_B$ varying between approximately 0.284 and 0.489 and $Z/R_B$ varying between approximately 0.09 and 0.261 in a second region between the second station $X_1 Y_1$ and a third station $X_2 Y_2$.

2. The nose and forebody of claim 1 wherein the planform nose radius, $R_N$ is equal to approximately $0.075 R_B$.

3. The nose and forebody of claim 1 wherein a line tangent to the nose tip forms an angle of approximately 35 degrees with an axis transverse to the centerline of the fuselage.

4. The nose and forebody of claim 1 wherein the edge radius, $R_c$, of the fuselage is a constant equal to approximately $0.006 R_B$ in said first region and increases linearly thereafter until $X/R_B = 0.60$ after which there is no discrete edge ratio.

5. The nose and forebody of claim 1 wherein the fuselage planform expands linearly after station $X_2 Y_2$ at an angle of approximately 8 degrees.

* * * * *